United States Patent [19]
Vincent

[11] Patent Number: 5,279,046
[45] Date of Patent: Jan. 18, 1994

[54] APPARATUS FOR CONDITIONING DIVIDED OR PARTICULATE MATERIAL
[75] Inventor: Maurice W. Vincent, Newbury, United Kingdom
[73] Assignee: Stork Protecon B.V., Netherlands
[21] Appl. No.: 776,434
[22] Filed: Oct. 18, 1991
[30] Foreign Application Priority Data
 Oct. 19, 1990 [NL] Netherlands ............ 9002290
 Dec. 20, 1990 [GB] United Kingdom ........ 9027693
[51] Int. Cl.⁵ .......................... F26B 13/00
[52] U.S. Cl. ......................... 34/35; 34/164;
  34/57 A; 34/52; 34/54; 34/216
[58] Field of Search ........... 34/164, 57R, 57A,
  57D, 210, 216, 217, 28, 52, 56, 44,
  30, 31, 57B, 29, 54, 10

[56] References Cited
U.S. PATENT DOCUMENTS

| | | |
|---|---|---|
| 2,876,557 | 3/1959 | Ducatteau . |
| 3,360,867 | 1/1968 | Sanderson . |
| 3,543,414 | 12/1970 | Gomarin ............ 34/164 |
| 3,892,044 | 7/1975 | Kayatz .............. 34/164 |
| 4,305,210 | 12/1981 | Christensen et al. ... 34/164 |
| 4,543,736 | 10/1985 | Brooks et al. . |
| 4,939,850 | 7/1990 | Baillie . |
| 5,034,196 | 7/1991 | Zenz et al. ......... 34/57 A |

FOREIGN PATENT DOCUMENTS

| | | |
|---|---|---|
| 43231 | 9/1968 | Australia . |
| 0209349 | 7/1986 | European Pat. Off. . |
| 606426 | 12/1934 | Fed. Rep. of Germany . |
| 1259848 | 2/1961 | Fed. Rep. of Germany . |
| 1919313 | 4/1989 | Fed. Rep. of Germany . |
| 2261050 | 2/1975 | France . |
| 439638 | 6/1934 | United Kingdom . |
| 1320083 | 8/1971 | United Kingdom . |
| 2054345 | 6/1980 | United Kingdom . |
| 2070751 | 2/1981 | United Kingdom . |

Primary Examiner—Henry A. Bennet
Assistant Examiner—Denise L. Gromada
Attorney, Agent, or Firm—Lowe, Price, LeBlanc & Becker

[57] ABSTRACT

The invention provides a fluid bed conditioning apparatus (especially a dryer) which comprises a plurality of connected treatment zones, each zone having an apertured base and means for supplying a fluidized gas through said apertured base to each zone to cause material therein to be fluidized. The apparatus includes means for vibrating each apertured base and the zones are separated by movable partitions which are operable in conjunction with transfer means for urging material from one zone to an adjacent zone whereby the contents of a first treatment zone can be transferred to the adjacent zone after a desired treatment time in the first zone.

18 Claims, 3 Drawing Sheets

APPARATUS FOR CONDITIONING DIVIDED OR PARTICULATE MATERIAL

This invention relates to apparatus for conditioning divided or particulate material and in particular is concerned with so-called fluid bed dryers. Fluid bed dryers have been widely used for drying a variety of particulate solid materials, especially materials such as cereal grains, including rice, and other vegetable products and e.g. in dehydration of crystals in the chemical industry, and has been a commonly used technique in the food and chemical industries.

There are essentially two broad types of fluid bed dryers which are conventionally employed. A first kind of existing system involves a continuously moving fluidised bed. In such systems, a relatively thin layer of fluidised particulate material is continuously moved through a tunnel-like dryer from the inlet end to the point of discharge. Fluidising air is introduced into the tunnel at intervals along its length and the material is moved along the tunnel by a conveying system such as a vibrating deck or an apertured conveying belt. Although continuous bed dryers utilizing a moving belt are capable of conveying a fluidised bed up to about 50 mms deep, (and rather less for a vibrating deck plate system), the depth of material which can be handled can be a severe limitation. Also, such systems become uneconomic where the desired drying rate is slow, since the achievement of such a drying rate does necessarily involve constructing a dryer tunnel which is very large.

Batch-wise fluid bed dryers overcome some of the disadvantages of continuous bed dryers inasmuch as the bed depth can be very much greater, e.g. typically up to 30 cms deep. Also, there is no limitation in the time of treatment so that very slow drying operations can be carried out in a batch dryer. However, batch dryers are not ideal since they suffer from the following drawbacks:

Operation is labour intensive because of the need to manually load and discharge feed material and dried product at intervals. This takes on an added significance where the processed material is objectionable or toxic to handle.

It is difficult to undertake a sequence of processing steps on the same material under different drying conditions, since such a procedure would require fine control of the process parameters, leading to risk of error.

Where the material to be processed is sticky or tends to interlock and forms clumps it is difficult to ensure that the fluidised bed remains sufficiently open for uniform heat and mass transfer. Although mechanical stirring devices are sometimes employed to overcome the problem, they present an additional obstacle when introducing and removing the basket of processed material.

The present invention is directed to the identification of solutions to the above problems and to provide improved methods and apparatus for fluid bed drying of particulate materials.

According to one aspect of the present invention there is provided a fluid bed conditioning apparatus which comprises a plurality of connected treatment zones, each zone having an aperture base and means for supplying a fluidised gas through said apertured base to each zone to cause material therein to be fluidised, characterised in that the apparatus includes means for vibrating each apertured base and in that said zones are separated by movable partitions which are operable in conjunction with transfer means for urging material from one zone to an adjacent zone whereby the contents of a first treatment zone can be transferred to the adjacent zone after a desired treatment time in said first zone.

Although the apparatus of the present invention can be used for conducting a wide variety of different kinds of treatment on fluidised materials, an important use of the apparatus is for drying products which are difficult to dry. Therefore for simplicity the invention will be primarily described with reference to its application to drying particulate materials, although it is to be understood that the invention is not confined to such use. In this specification the term "particulate materials" is intended to mean any material which is capable of being fluidised and includes powders, grains, crystals or broken, divided or shaped discrete material.

The fluid bed dryers of the present invention which can conveniently be termed "sequential batch fluid dryers" essentially combine the advantages of batch and continuous bed dryers. Because the material to be dried is confined temporarily to a drying zone for a predetermined time interval, a greater depth of material can be treated before transfer to a adjacent zone where the drying process is continued. The drying process then continues by transferring the processed material to the next zone until the final dried product is discharged from the end of the apparatus. Depending upon the number of zones combined in the apparatus, (which may be, e.g. from 2 to about 10 or 12), material to be dried can be introduced and the dried product obtained from the process virtually on a continuous basis.

Also, because of the plurality of separate treatment zones, material can be dried under different conditions in different zones in the apparatus, so that more precise control can be imposed upon the total drying procedure. This is a frequent requirement for products which have very precise drying conditions. It is, for example, a not uncommon requirement that a product should be dried rapidly in a first stage until a certain moisture level is reached, whereupon less severe drying conditions are required in a second stage or vice versa. By providing control devices for altering the air flow rates, treatment times, temperatures and degrees of agitation in separate zones, the conditions of drying in each stage and in the overall process can be precisely controlled.

The drying zones need not all be physically separated from adjacent zones and may or may not be part of a single drying tunnel or other elongated chamber. For example, in one embodiment the drying zones are formed by providing a elongated drying tunnel which is divided into a series of sequential cells by partitioning means such as movable doors which can be individually controlled to permit material to be moved from one zone to another as required. These cells need not be part of an overall drying chamber but can, in a further embodiment, be formed as separate chambers which are linked by passages for transferring product from one cell to the next.

In a preferred embodiment the treatment zones are constructed as an elongated chamber comprising an apertured base and side walls defining a channel, which need not be covered. Transfer of material from one zone to the next is preferably achieved by the combined action of vibrating the apertured base and additional transfer means. Such transfer means may comprise the movable partitions which separate the treatment zones.

For example, they may be constructed as two or more paddles mounted on a shaft which extends across the channel. By rotating the shaft material can be urged from one zone to the adjacent one.

The means for transferring the material from one zone to the next may include movable belts, in conjunction with a vibratable deck, or alternatively air jets may be used to assist the transfer of material from one zone to another. Such air movement systems may include the use of angled orifices in the deck of the fluidised bed. This can be arranged by deforming the deck of the fluidised bed so that angled orifices are formed through which air may be injected to cause air streams to flow along the deck and thereby induce the material to flow from one zone to another. A commercially available metal screen sold under the trade mark "Conidur" by Heine Lehmann GmbH is formed with angled holes and may be used in the construction of the deck of the fluidised bed. However, we currently prefer to employ positive means for transferring the material between zones such as screws, paddles or belts.

Whereas the operation of the dryer may conveniently be controlled by a programmable logic controller, which would control temperatures of input air, air volume and residence time in each drying zone, it would be theoretically possible to control the operation of the process by manually operating the means for separating the zones and the transfer system so as to move material as desired from one zone to another.

In cases where the product to be dried is sticky or tends to clump together because of the shape or nature of the particle surfaces, special measures can be taken to overcome the problem. This is a particular problem when drying dried vegetables or minced meat or the broken pieces of split hides which are the raw material for fibrous collagen production in the process described in PCT/GB90/00344 (WO 90/10393).

According to a further aspect of the invention therefore there is provided a fluidised bed apparatus for conditioning divided or particulate material which comprises at least one treatment zone for fluidising the material to be conditioned, an apertured supporting surface in the base of said zone, means for passing a first stream of gas through said surface to fluidise material within the zone and one or more discharge tubes for discharging gas into a fluidised mass of said material at a higher velocity than said first stream of gas.

The fluidised bed apparatus of this invention may include such higher velocity gas orifices (hereinafter referred to as 'jet tubes') in the apertured base of some or all of the zones described above. In general, it may only be necessary to include them in the first zone or two since the material tends to become less likely to stick together or agglomerate once it has been partially dried. However, the use of jet tubes in a fluidised bed may also be employed with conventional fluid bed dryers, especially batch dryers and the present invention extends to such use.

The discharge tubes need not be immersed directly in the fluidised bed of material, but are preferably located so as to discharge just beneath the apertured support surface. While there is no specific critical diameter for the discharge tube, since this partly depends on the number and spacing of the tubes, conveniently the discharge tube should have a diameter at the discharge end in the range of about 10 to 100 mms, preferably 20 to 60 mms, e.g. 50 mms. The discharge tubes may be connected to the same source of air or other gas as the fluidising air, but because of their smaller diameter will result in a discharge velocity greater than that of the bulk of the fluidising air.

During transfer of the material from one zone to the next, the jet tubes may be turned off, so that the material is subject to less agitation but is still fluidised.

Various illustrative embodiments of apparatus in accordance with the present invention will now be described with reference to the accompanying drawings, in which.

Figure 1:
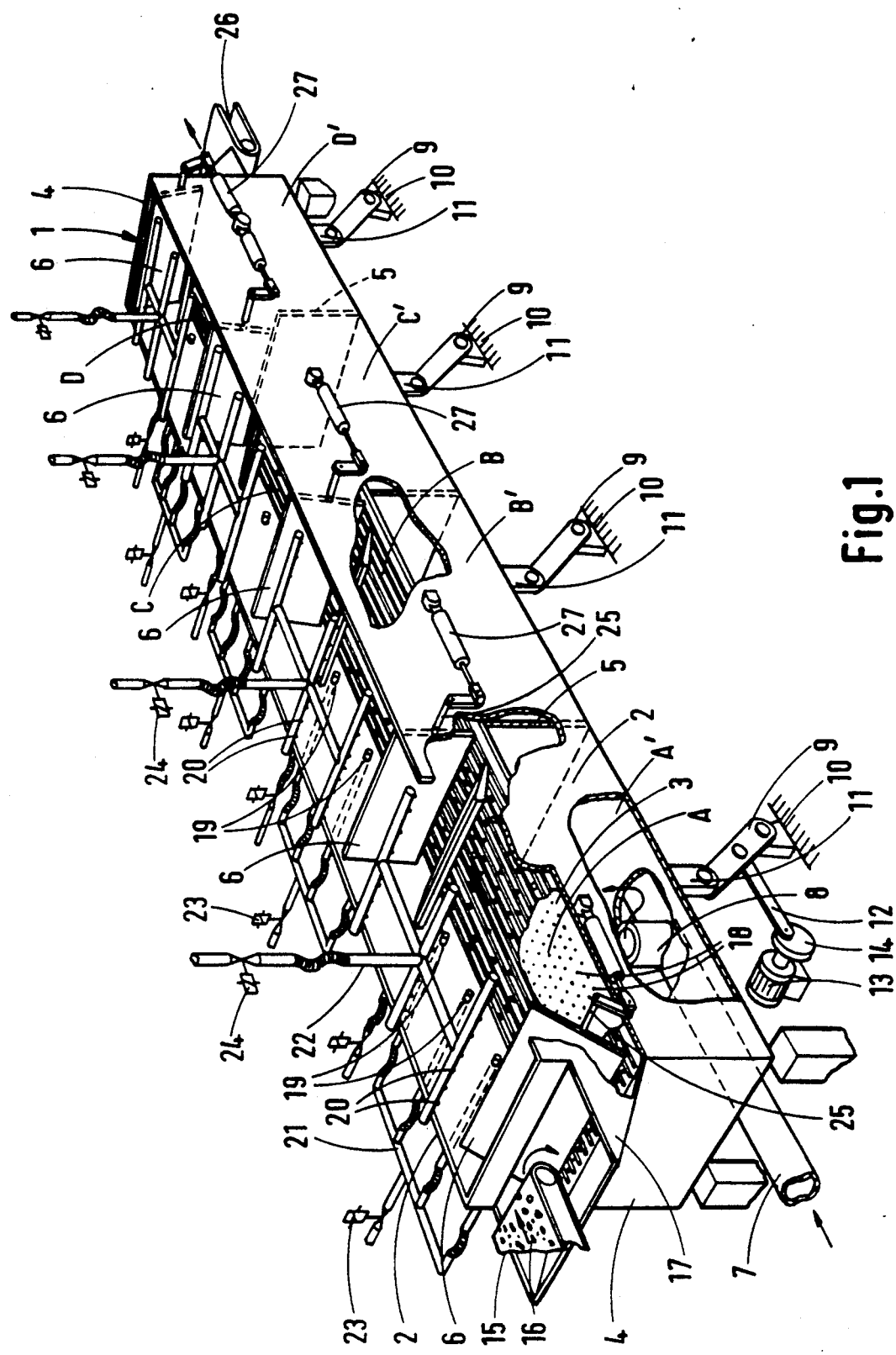
FIG. 1 is a perspective view of one embodiment in accordance with the invention, partly broken away to show the interior.

Referring to the drawings and in particular to FIG. 1, the apparatus comprises an elongated channel 1, formed from side plates 2 and an apertured or slotted deck plate 3. The side plates 2 extend downwardly to form, with end plates 4 and transverse plates 5, a series of independent plenum chambers A', B' C' etc. Each of the plenum chambers corresponds with a treatment zone A, B, C etc. formed by the side plates and movable doors 6. Fluidising air or other gas is supplied to the plenum chambers via a supply pipe 7 and distributed to each plenum chamber through branch pipes 8.

The entire apparatus is supported on lever arms 9 which are connected at one end to a solid base at 10 and at the other to the underside of the chamber 1 via brackets 11. At least one lever arm 9 is connected by a crank 12 which is driven by electric motor 13 via an excentric coupler 14. By means of springs not shown lever arms 9 are biased into their rest position so that operation of the motor 13 causes the chamber 1 to be subjected to a vibrating motion having longitudinal and vertical components. Further details of the construction of the vibrating mountings for tunnel dryers may be found in Dutch Patent Application No. 186110 and U.K. Patent No. 907,121.

A conveyor 15 is arranged to supply material 16 to be dried or otherwise conditioned to the chamber 1. Conveyor 15 deposits material into a hopper 17 from which its entry into the first treatment zone A is controlled by first movable door 6. Once the material 16 enters the first zone it is fluidised by air passing upwardly through the apertures 18 in the apertured base. The apertures may be of any desired shape but a minimum 'land' area is desirable and slotted apertures extending in the longitudinal direction of the chamber 1 are preferred. While being fluidised within zones A, B, C etc., air or other gas may be injected into the fluidised mass through nozzles 19 located in the side walls of the chamber. Additionally or alternatively, the fluidised mass may be further agitated by means of air jets or air nozzles 20 located above the fluidised mass. Air supplies to these nozzles are provided through distribution conduits 21 and 22 having flexible connections with the main air supply pipes. Valves 23 and 24 are provided to control the air flows to nozzles 19 and 20 respectively.

After treatment for the desired time in a first zone A, the treated material is transferred to the adjacent zone. This is achieved by a combination of operating the vibratory/shaking support for the chamber 1 (which is arranged to urge material in the direction from zone A to B and so on by operating the second door 6 to scrape material from zone A into zone B. To this end, each of doors 6 are pivotably mounted on a transverse shaft 25. Each shaft 25 is linked by a lever to a piston and cylinder unit 27 which may be operated in such a way to reciprocate the door about the shaft so as to force material in the vicinity of the door into zone B. The shaking action of the vibratory mounting device causes material in zone A to be moved to the vicinity of door 6 to replenish the amount moved into zone B. Thus, reciprocation of door 6 in conjunction with vibration of the deck plate 3 causes material to be moved continuously into zone B. It will be appreciated that instead of a piston and cylinder unit any other type of prime mover may be used to operate the transfer means.

By similar operations of movable doors between subsequent treatment zones, material may be caused to be moved from the feed end of the dryer to the outlet end and onto outlet conveyor 26.

Although not shown specifically in FIG. 1, the air supply to each plenum chamber is separately controllable as to air/gas volume per unit time and as to temperature. In this way, the drying or other treatment conditions can be varied and controlled. Also, the residence time in each zone can be controlled by the timing sequence of the operation of the movable doors 6.

Figure 2:
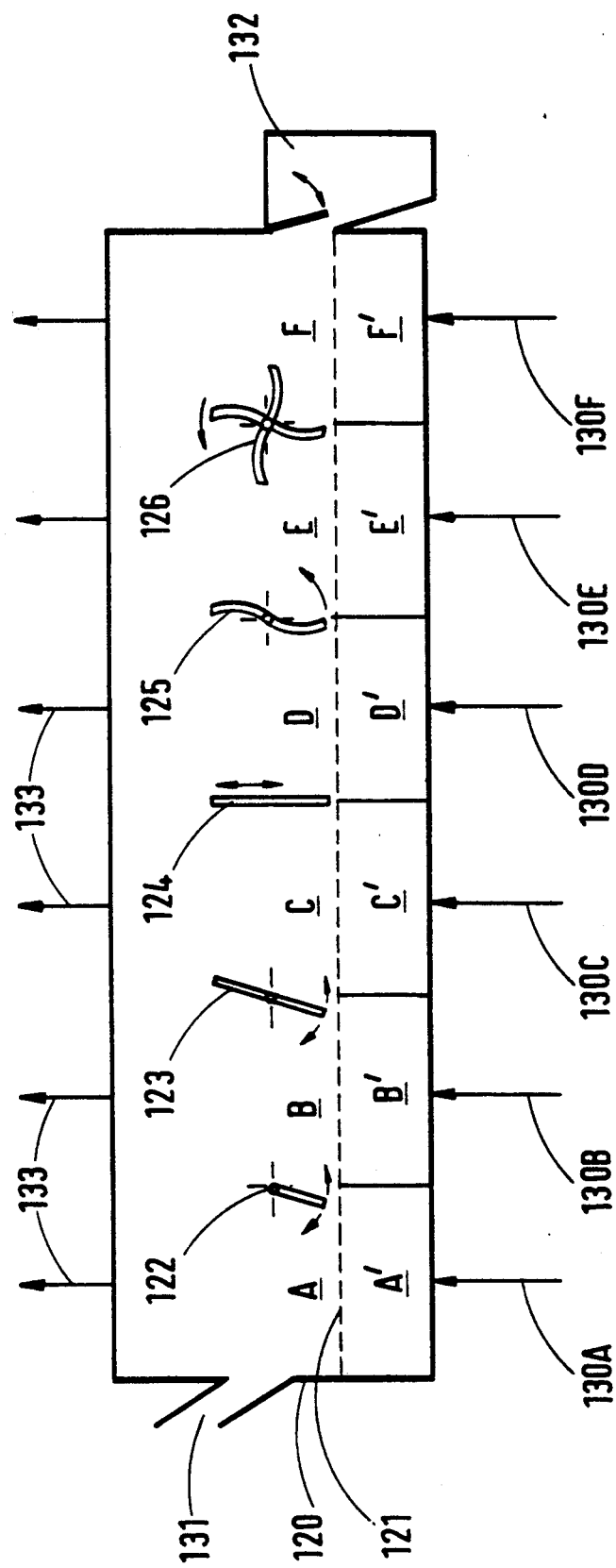
FIG. 2 is a schematic view of the apparatus similar to that shown in FIG. 1 but illustrating the method of operation.

FIG. 2 depicts schematically an apparatus which operates on the same principles as that in FIG. 1, but has other features which will become apparent. Referring to FIG. 2, the fluid bed apparatus comprises a channel or tunnel-shaped chamber 120 having a deck 121 which is apertured, e.g. by perforations or slots. Chamber 120 is partitioned laterally at longitudinally spaced intervals by movable doors 122, 123, 124, 125, 126 which partition the chamber into six treatment zones A, B, C, D, E and F. Each treatment zone is arranged to receive fluidising air or other gas from a corresponding plenum chamber A', B', C', D', E' and F', located beneath the corresponding zone. Air or other gas can be fed to the plenum chambers via inlets 130A, 130B, 130C, 130D, 130E and 130F. These inlets are preferably individually controllable so that the pressure, air flow, temperature and humidity of air or gas fed to each plenum chamber can be individually monitored and varied. The deck plate 120 or the entire apparatus is connected to a vibratory shaker device, e.g. of the kind described in Dutch Patent Application No. 186110 or U.K. Patent No. 907,121.

Material to be treated is introduced into the chamber 120 via inlet port 131 and is fluidised in zone A. Additional agitation of the material may be effected by air nozzles located in the side walls of the tunnel shaped chamber as described in connection with FIG. 1. In each processing zone A, B, C etc., the material when fluidised will form a fluidised bed which depends primarily on the density of the material and air velocity of the gas emerging through the apertured deck plate. The fluidised bed should not extend above the height of the doors and typically forms a bed about 20 to 30 cms deep. As shown, a free space is provided above the movable doors within the chamber 120. When the material in zone A has reached a desired desired condition, determined by detecting means (not shown), or calculated by predicted treatment time, door 122 is operated and material is transferred to adjacent zone B. Sequentially, with this transfer, zone A is replenished with fresh material. Treatment is then continued of part processed material in zone B under the same or different conditions as in zone A. This procedure is continued sequentially in an analogous fashion in zones C, D, E and F until the material is discharged through outlet hopper 132. Air or other gas is discharged from chamber 120 through one or more exhaust outlets 133.

Although, in practice, the doors separating each zone will normally be of the same kind or method of operation, FIG. 2 illustrates various arrangements. Doors 122 and 123 are pivoting plates hinged at the top, while door 124 is arranged to slide up and down in guides. Doors 125 and 126 comprise two or more paddles fixed to a rotatable shaft so that on rotation the paddles tend to scoop material continuously towards the adjacent zone. The paddles may be flat or shaped. Operation of the doors can be effected in a number of possible ways. Preferably, electric or air motors or air-operated cylinders are employed. However, for heavy duty embodiments, it may be preferable to employ hydraulic cylinder units to operate the doors. Preferably, the majority or all the partitions are constructed as indicated at 125 or 126.

Instead of using movable doors or similar physical partitions between the separate treatment zones, the zones may be temporarily separated from one another by other means. One method is to use a pneumatic curtain or air knife to provide a curtain of air or gas which inhibits material from passing into an adjacent zone. Another non-physical method of separation is to provide an electromagnetic or electrostatic field between adjacent zones. In order to establish such a field an electrode is located in the vicinity of the deck plate and a similar electrode spaced above it by a suitable distance so that a field of sufficient strength to stop the material from flowing between adjacent zones is developed. This system can be operated using AC or DC voltages and works best with material which has suitable electrical properties, such as an electrical dipole. Obviously, in these non-physical partitioning systems, the material can be permitted to flow between two adjacent zones by shutting off the air curtain or switching off the electrical field.

Transfer of material from one zone to another can be achieved in a number of ways. One way is to lift the chamber at one end, e.g. on hydraulic piston/cylinder units, so that the deck slopes towards the discharge end. However, more sophisticated methods may be employed.

Figure 3:
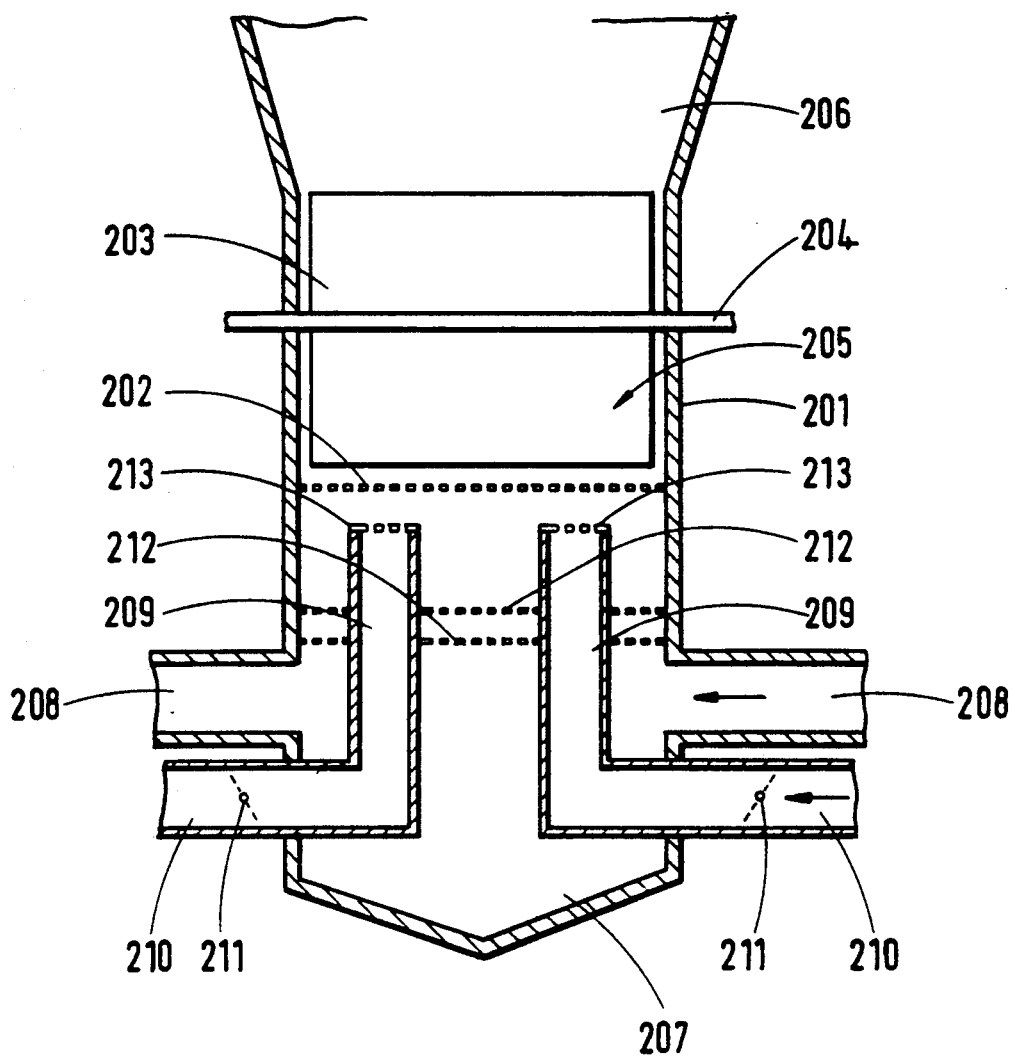
FIG. 3 is a schematic view of a vertical section through one zone of fluidised bed apparatus in accordance with the invention.

FIG. 3 shows the currently preferred method of providing fluidising air to each conditioning zone. In FIG. 3 each conditioning zone is formed by vertical walls 201 and an apertured supporting or conveying surface 202 upon which the material to be conditioned is treated. The conveying surface 202 is part of a vibrating deck plate system and the general construction of the apparatus is as shown in FIGS. 1 and 2. A rotatable door 203 serves to partition the treatment zone from an adjacent zone and is mounted on a shaft 204, the arrangement being such that once the required degree of drying or other conditioning has been applied to the material within the zone, the door 203 can be rotated to a horizontal position so as to enable the material to pass to the next zone. Above the treatment zone 205, the apparatus includes a disengagement zone 206.

The air feed system for feeding fluidising air to the treatment zone includes a plenum chamber 207, located beneath the supporting surface 202, which is fed via passages 208 with air from a source of pressurised air.

Extending through the plenum chamber 207 are one or more discharge tubes 209 which terminate just below the conveying surface 202. Air is fed to the discharge tubes 209 along passage 210 and may be connected to a common air supply to the plenum chamber 207. Air distribution plates 212 are located in the plenum chamber 207 for equalising pressure flow through the plenum chamber. Similarly, apertured air distribution plates 213 may be located across the discharge end of the jet tubes 209.

As shown in FIG. 3, passages 210 include perforated dampers 211 which adjust the rate of flow through the discharge tubes. These dampers are closed during the filling of the treatment zone with material to be processed, so that the air flowing through the conveying surface will be substantially uniform. This prevents excess material being entrained in air in the cover.

Once the required bed depth has been built up in the treatment zone, the damper is opened to permit the velocity in the jet tubes to be increased to the required level to agitate the fluidised mass. The velocity of air through the tubes 209 is dependent on the nature of the processed material and the depth of the bed.

After treatment of the processed material in a first zone, it may be moved from the first zone to the next by rotation of the door 203. This can be achieved by means of a servo-motor operating on the shaft 204. At the same time, perforated damper and feed tubes 210 are closed until the fluidised bed has been re-established, whereupon the damper can be reopened.

Preferably, the conveying surface 202 has a minimum of land area and is formed with angled holes or slots to facilitate transfer to the adjacent zone.

The technique of combining jet action with the fluidising effect is applicable generally to treatment of large piece-form products which are high in moisture content and/or become sticky during the early stages of processing. It would also be applicable to large piece form products which have irregular shape and which would tend to interlock, thus frustrating fluid bed action.

Specific applications include meat chunks, irregularly shaped vegetable pieces such as sugar beet shreds, distillery-spent grains and irregularly shaped noodles, particularly those having a high ratio of length to cross-section or linear size.

Apparatus in accordance with the present invention is particularly useful for drying and treating collagen, e.g. for the purposes described in PCT patent application No. PCT/GB90/00344. Collagen is a different material to process and readily sticks together or degrades to gelatin when attempts are made to process it.

However, a wide variety of materials may be dried or conditioned using the apparatus in accordance with this invention. Examples are animal feedstuffs, vegetable pieces, apple pulp, milk products, cereals, soya products, sugars, whey and wood chips, salt crystals and antibiotics. Although the invention has been described with particular reference to drying, the apparatus may also be adapted for other kinds of conditioning. Such conditioning treatments include coating, freezing, agglomerating, toasting, roasting, cooling, heating and effecting chemical reactions. For example, it may be desired to coat particulate materials and this may be achieved using spray devices in some or all of the zones in the apparatus as described above. For example, in the apparatus shown in FIG. 1 sprayheads may be disposed over one or more of the treatment zones, e.g. in the position indicated by nozzles 20, for applying a coating to material while it is being fluidised and simultaneously dried. Although air is the usual fluidisation gas, other gases may be employed alone or in conjunction with air in one or more of the treatment zones.

I claim:

1. A fluid bed conditioning apparatus which comprises:
a plurality of connected treatment zones, each zone having an aperture base means for supplying a fluidized gas through said aperture base to each zone to cause material therein to be fluidized, wherein the apparatus includes means for vibrating each aperture base and said zones are separated by movable partitions which are operable in conjunction with transfer means for urging material from one zone to an adjacent zone and timing means for controlling the operation of the movable partitions to cause the contents of a first treatment zone to be transferred to an adjacent zone after a desired treatment time in said first zone.

2. An apparatus according to claim 1 wherein the plurality of treatment zones is in the form of an elongated chamber comprising an apertured base having side walls defining a channel.

3. An apparatus according to claim 2 wherein said movable partitions are doors extending across the channel.

4. An apparatus according to any one of the preceding claims wherein the movable partitions comprise said transfer means.

5. An apparatus according to claim 4, wherein the movable partitions comprise a plurality of paddles mounted on a shaft which extend across the channel, wherein rotation of the paddles on said shaft causes material to be transferred from one treatment zone to an adjacent zone.

6. An apparatus according to claim 1 wherein the means for vibrating the apertured base applies oscillations having both vertical and horizontal components to each apertured base.

7. An apparatus according to claim 1, wherein the transfer means comprises angled gas jets located in either the base or side walls of the chamber.

8. An apparatus as claimed in claim 1 which includes control means for individually controlling the temperature of the fluidizing gas to the treatment zones.

9. An apparatus as claimed in claim 1 which includes control means for individually controlling the rate of flow of the fluidizing gas to the treatment zones.

10. A fluid bed apparatus for drying particulate materials by a sequential batch fluid bed drying processes which comprises:
a plurality of connected treatment zones, each zone having an apertured base and means for supplying fluidizing air through said apertured base to each zone to cause particulate material therein be fluidized, said apparatus including means for vibrating said apertured base and said zones being separated by movable partitions which are operable in conjunction with transfer means for urging material from one zone to an adjacent zone, and wherein said apparatus includes timing means for controlling the operation of the movable partitions to cause the contents of a first treatment zone to be transferred to the adjacent zone after a desired treatment time in said first zone.

11. An apparatus as claimed in claim 10 further including control means for individually controlling the flow of air supplied to each treatment zone.

12. An apparatus as claimed in claim 10 further including control means for individually controlling the temperature of air supplied to each treatment zone.

13. An apparatus as claimed in claim 10 which is in the form of an elongated chamber comprising a continuous aperture base having side walls defining a channel which is divided by a plurality of transversely extending moveable partitions for forming said connected treatment zones.

14. An apparatus as claimed in claim 13 further comprising at least one discharge tube arranged to discharge air into at least one treatment zone at a velocity greater than the velocity of the fluidizing air.

15. An apparatus as claimed in claim 14 wherein said at least one discharge tube terminates below the apertured base.

16. An apparatus as claimed in claim 13 wherein said discharge tube has a diameter at its discharge end of between about 10 and 60 mms.

17. An apparatus as claimed in claim 1, wherein said movable partitions comprise a continuous surface capable of separating adjacent zones.

18. An apparatus as claimed in claim 10, wherein said movable partitions comprise a continuous surface capable of separating adjacent zones.

* * * * *